Sept. 27, 1932.   A. MEISSNER   1,880,102
LIGHT CONTROL ARRANGEMENT
Filed July 2, 1926
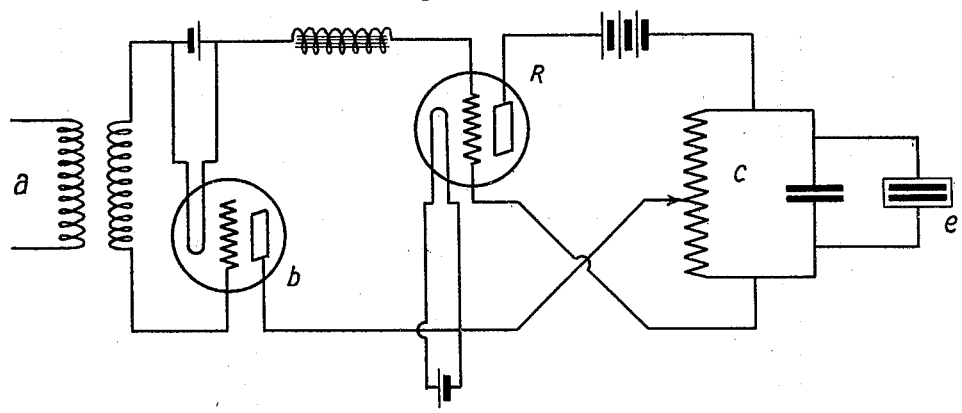
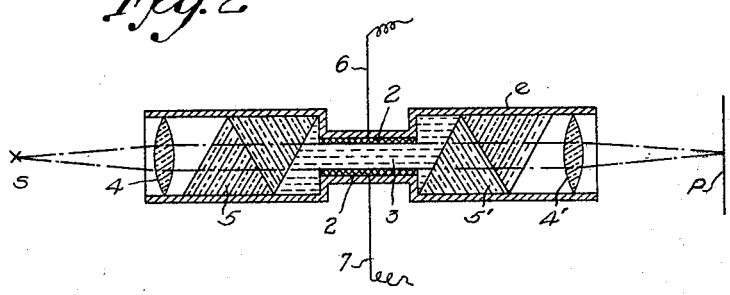
Inventor
ALEXANDER MEISSNER
By his Attorney Ira J. Adams Patented Sept. 27, 1932

1,880,102

UNITED STATES PATENT OFFICE

ALEXANDER MEISSNER, OF BERLIN, GERMANY, ASSIGNOR TO TELEFUNKEN GESELLSCHAFT FUR DRAHTLOSE TELEGRAPHIE M. B. H., OF BERLIN, GERMANY

LIGHT CONTROL ARRANGEMENT

Application filed July 2, 1926, Serial No. 120,069, and in Germany August 18, 1925.

One of the main difficulties in connection with the use of the electrostatic Kerr effect consists in that the liquids coming into consideration for the said effect having a high dielectric constant possess a relatively very high and fluctuating conductivity. According to the present invention the difficulties due to the conductivity are obviated or rendered harmless for the reason that influences only of very high frequencies, say, nearly $10^6$ periods or even higher, are used at the Kerr cell. As a consequence, the sensitivity of the relay arrangement is considerably enhanced. As shown in Fig. 1, the best plan probably is then to proceed so that the incoming signals or sounds or other variations are brought to act upon a small radio frequency generator tube in the form of modulation.

The invention is illustrated by the accompanying drawing, wherein;

Fig. 1 of the drawing shows, by way of example, one embodiment of the circuit arrangement for controlling a Kerr cell by the principles underlying the invention; and, Fig. 2 shows diagrammatically the arrangement of the Kerr cell, together with its associated light source, analyzers and Nicol prisms.

Referring to Fig. 1 of the drawing, R is a generator tube in what has become known as the three-point connection. Connected with the condenser of the oscillation circuit C is a Kerr cell $e$. The Kerr effect might be defined as electric double refraction in a condenser filled with a suitable medium. The most common filling medium is nitro-benzol, although any other medium which possesses like properties could be used equally as efficiently, and I do not desire to limit this arrangement to any one medium in the cell. In the drawing, the letter $e$ has been applied to the Kerr cell, per se, but the showing is merely diagrammatic, and $e$ will, therefore, be assumed to include the entire prism and lens arrangement of Fig. 2 by which the cell operates, e. g., a light source S directing the light beam issuing therefrom upon a condensing lens 4 from where it is carried through a Nicol prism 5 and after being polarized in said Nicol prism is passed between the plates 2,2 of the Kerr cell $e$, where due to variation in voltage on the said plates circuit C, the light passing between the plate is acted upon so that the plane of polarization is changed, or in other words, the plane polarized light beam is elliptically polarized, by reason of the fact that the effect produced is to speed up the vertical component of the light beam with respect to the horizontal component, the effect produced thus being to control the light which is about to reach the second Nicol prism 5'. Upon the light beam passing out between the electrodes 2 of the cell, it is passed through a second Nicol prism 5' and from there through a focusing lens 4' to some recording means P, such as a phono-electric or photo-electric film. Therefore, as shown by Fig. 2, the Kerr cell $e$ of Fig. 1 will be understood to comprise a light source S, a condensing lens 4, a first Nicol prism 5, a condenser or spaced electrodes 2, 2 (that is the Kerr cell per se,) a second Nicol prism 5', a focusing lens 4', and a light recording means S.

To now refer again to Fig. 1 the generator R produces a frequency of $10^6$ (1000 kilocycles) or even of a still higher order of magnitude. The incoming signals or the signals to be reproduced are supplied by leads $a$ through any desired coupling to the grid of a modulator tube $b$, which is preferably arranged in parallel to the grid-cathode circuit of the oscillation tube R proper. As will be understood, voltage variations are set up at the Kerr cell having a frequency which differs by the relatively low signal frequencies from the oscillation frequency of the transmitter. Hence, what is obtained is a control of the Kerr cell by high frequency potentials whereby the disadvantages occasioned by the conductivity of the dielectric are obviated.

Having described my invention, I claim:

1. An arrangement for controlling light beams passing through a Kerr cell and its associated optical system which comprises a vacuum tube oscillator having a portion of its oscillatory circuit shunted by the Kerr cell, a modulator tube having its input circuit connected with a source of signal energy and its output circuit forming a part of the oscillatory circuit of said oscillator tube, and means provided by said connection of said modulator and oscillator tubes for causing a modulation of said high frequency energy whereby high frequency energy is supplied to said Kerr cell and the light passing therethrough is given a high frequency variation whose amplitude is modulated by incoming low frequency signal energy pulses.

2. In combination with a thermionic oscillator having an impedance in the circuit thereof, a thermionic modulator having its output circuit connected at an intermediate point of said impedance in said oscillatory circuit and forming a part of said oscillatory circuit, and a Kerr cell shunting said impedance in said oscillatory circuit whereby high frequency energy as generated in said oscillator and modulated by said modulator is supplied directly to the Kerr cell terminals, whereby the conductivity effects of the dielectric materials within the Kerr cell are reduced.

ALEXANDER MEISSNER.